United States Patent Office 3,213,077
Patented Oct. 19, 1965

3,213,077
METALLIZED AZO DYES
Piero Maderni, Binningen, Reinhard Neier, Basel, and Walter Wehrli, Riehen, Switzerland, assignors to Sandoz Ltd., (a/k/a Sandoz A.G.), Basel, Switzerland
No Drawing. Filed Jan. 18, 1963, Ser. No. 252,290
Claims priority, application Switzerland, Jan. 19, 1962, 634/62; Feb. 9, 1962, 1,595/62
9 Claims. (Cl. 260—145)

This invention relates to valuable azo dyes which in the metal free form have the formula

$$\begin{array}{c} X \\ | \\ A-N=N-B \end{array} \qquad (I)$$

in which:
A represents the radical of a diazotized aromatic amine,
B represents the radical of a coupling component belonging to any one of the following series: acetoacetylamines, 1,3-diaminobenzenes, aminopyrazoles, hydroxybenzenes which couple in ortho-position to the hydroxy group, aminonaphthalenes which couple in the adjacent position to a primary or secondary amino group, hydroxynaphthalenes which couple in the adjacent position to the hydroxy group, 2-hydroxynaphthalenes which may be substituted in the 3-, 4-, 5-, 6- and/or 7-positions by an acylamino group or groups and which couple in the adjacent position to the hydroxy group, and
X represents a metallizable group or a substituent which is convertible into a metallizable group and which occupies the ortho or adjacent position to the diazo group.

In this formula at least one of the radicals A and B is substituted by at least one group of the formula

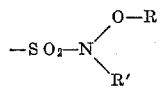

wherein R represents a substituted or unsubstituted hydrocarbon radical and R' hydrogen or a substituted or unsubstituted hydrocarbon radical.

These new dyes (I) can conveniently be prepared by coupling a diazotized aromatic amine having a group capable of metal complex formation with a coupling component of the formula

H—B wherein B has the meaning cited in the foregoing. The diazo component and/or the coupling component must contain at least once the group of the formula

The group

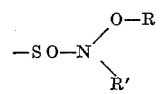

occupies preferably the meta or para position with respect to the diazotizable amino group.

The diazo component may be further substituted, e.g. by chlorine, the alkyl or nitro group or by any other, preferably non-water-solubilizing, substituents. The coupling components of the series enumerated under B may also contain further, preferably non-water-solubilizing, substituents, for example halogen, alkyl, alkoxy, alkylsulfonyl, sulfonylamino, alkylsulfonylamino, dialkylsulfonylamino etc.

The coupling reaction can be performed by any of the known methods. The resulting compounds may be treated with metal-yielding, such as cobalt- or preferably chrome-yielding agents either in substance or on the fiber. The dyes are also suitable for application as afterchrome dyes.

Suitable chromium compounds are e.g. chromic fluoride, chromic sulfate, chromic formate, chromic acetate, chromic potassium sulfate and chromic ammonium sulfate. The chromates also, e.g. sodium and potassium chromate or bichromate, are suitable.

The formation of the chromium complexes is carried out in the known manner, i.e. a solution of a chromium salt, if desired with an addition of an organic solvent, e.g. one of the formamides, is allowed to act upon the dye, preferably at a higher temperature. The organic metallizing solution is run into water if desired and the metal complex compound precipitated by the addition of salt, filtered, washed and dried.

The new dyes are used for dyeing, padding and printing fibers of animal origin, e.g. wool, silk; synthetic polyamide fibers, e.g. nylon; paper and leather. They can also be used for dyeing and printing materials of polymers containing more than 80% acrylonitrile, e.g. polyacrylonitrile, such as "Acrilan" (registered trademark), and copolymers of 95% acrylonitrile and 5% vinyl acetate. They are applied to these materials from a neutral to weakly acid medium to give dyeings and prints of good depth and good fastness to light, washing, perspiration, water, carbonizing, rubbing, alkalis and chlorine.

The dyes conforming to the above definition dye very well blended fabrics containing an acrylic fiber as one of the two components. A number of them are well suitable for dyeing polyacrylonitrile in the mass in light- and wet-fast shades. Those which have good solubility in organic solvents are also suitable for the mass coloration of oils, plastics, paint and lacquer media, and artificial fiber in solution in organic solvents.

In the following examples the parts and percentages are by weight and the temperatures in degrees centigrade.

EXAMPLE 1

21.8 parts of 1-amino-2-hydroxybenzene-5-sulfonic acid methoxyamide are diazotized in 20 parts of 30% hydrochloric acid and 100 parts of water with 6.9 parts of sodium nitrite with ice cooling. The diazo solution is run into a solution of 10.8 parts of 1,3-diaminobenzene in 100 parts of acetic acid and stirred until formation of the azo dye is complete. This is precipitated with sodium chloride, filtered and dried.

16.9 parts of the above azo dye and 13 parts of crystallized chromic potassium sulfate in 150 parts of formamide are heated at 100° until no further metal-free dye is indicated in the reaction mass. The dye is precipitated by dilution with water, filtered and dissolved in water with the acid sodium hydroxide, precipitated with common salt, filtered and ground. It is a dark powder that dissolves in water with brown coloration and dyes wool, silk, leather, polyamide and polyacrylonitrile fibers from a neutral to weakly acid bath in brown shades of good fastness to light, washing, perspiration, water, carbonizing, rubbing, alkali and chlorine.

EXAMPLE 2

21.8 parts of 1-amino-2-hydroxybenzene-5-sulfonic acid methoxyamide are diazotized in 20 parts of 30% hydrochloric acid and 100 parts of water with 6.9 parts of sodium nitrite with ice cooling. The diazo solution is run into a solution of 25.2 parts of 1-aminonaphthalene-4-sulfonic acid methoxyamide in 150 parts of acetic acid and stirred until formation of the azo dyes is complete. This is precipitated with sodium chloride, filtered and dried. On grinding it is obtained as a red powder which dissolves in water to give red solutions and dyes wool in red shades which when afterchromed change to grey.

24.1 parts of the above azo dye are heated with 13 parts of crystallized chromic potassium sulfate in 150 parts of formamide at 100° until no further metal-free dye is indicated in the reaction mass. The dye is precipitated by diluting with a saturated aqueous solution of common salt, and filtered off. The dark-coloured paste is stirred into dilute aqueous sodium hydroxide solution, dissolved, precipitated with sodium chloride, filtered and dried. It is then ground to give a dark powder which dissolves in water a grey coloration and dyes wool, silk, leather, polyacrylonitrile and polyamide fibers from a neutral to weakly acid bath in grey shades fast to light, washing, perspiration, water, rubbing, stoving, alkali and chlorine.

EXAMPLE 3

21.8 parts of 1-amino-2-hydroxybenzene-5-sulfonic acid methoxyamide are diazotized in 20 parts of 30% hydrochloric acid and 100 parts of water with 6.9 parts of sodium nitrite, and the diazo solution neutralized at 2–3° with sodium bicarbonate. It is then run with vigorous stirring into a mixture of 30 parts of 1-dimethylamino-sulfonylamino-7-hydroxynaphthalene, 200 parts of water and 30 parts of calcium hydroxide cooled to 4°. The suspension is stirred until completion of the coupling reaction, then hydrochloric acid is added to give a strongly acid reaction to Congo paper, and the dye filtered off, washed with water until free of acid, and dried with vacuum.

This dye dyes wool by the afterchrome process in level grey shades which have good fastness to light, washing, water, carbonizing, perspiration, rubbing, stoving, chlorine, milling and potting.

EXAMPLE 4

24.7 parts of the azo dye of Example 3 are added to 225 parts of formamide and dissolved by heating at 90–100°. Over 15 minutes a mixture of 20 parts of crystallized sodium acetate and 17.5 parts of chromic ammonium sulfate are added to the solution in small portions. The reaction mass is maintained at 95° until formation of the chromium complex is finished. The solution is diluted at 20–25° with 400 parts of a 10% sodium chloride solution and the precipitated dye filtered off, washed with 10% sodium chloride solution, dried and ground.

The chromium complex is a black powder which dissolves in concentrated sulfuric acid with a violet coloration and dyes wool, silk, leather, polyamide and polyacrylonitrile fibers from a neutral to weakly acid bath in grey shades that are fast to light, washing, perspiration, carbonizing, rubbing, stoving, chlorine, water and potting.

When the azo component of Example 3 is replaced by the equivalent amounts of the compounds listed in Table 1 and the chromium complex is produced according to the particulars of Example 4, further chromium complexes of good light and wet fastness are obtained.

Table 1

| Example No. | Azo component | Shade of chromium complex on wool |
| --- | --- | --- |
| 5 | 1-hydroxy-4-chloronaphthalene | Violet-blue. |
| 6 | 2-hydroxy-5-dimethylaminonaphthalene | Do. |
| 7 | 1-hydroxy-5,8-dichloronaphthalene | Do. |
| 8 | 1-hydroxy-4-methoxynaphthalene | Blue-grey. |

EXAMPLE 9

21.3 parts of the monoazo dye obtained by coupling diazotized aminobenzene with 2-acetylamino-1-hydroxybenzene and subsequent cleavage of the acetyl radical, are dissolved with 6 parts of sodium hydroxide in 400 parts of water. After the addition of 6.9 parts of sodium nitrite it is run into a solution of 35 parts of 30% hydrochloric acid and 100 parts of ice-water with ice cooling. The yellow-brown diazo compound is precipitated. It is filtered off and run with ice cooling into a solution of 28.6 parts of 1-acetoacetylaminobenzene-3-sulfonic acid methoxyamide in 20 parts of 30% sodium hydroxide solution, 30 parts of pyridine and 200 parts of water. The mass is stirred until formation of the disazo dye is complete. It is precipitated with sodium chloride, isolated, dried and ground to give a brown powder. Applied to wool by the afterchrome process it gives yellow-brown dyeings of high light and perspiration fastness.

For conversion into the chromium complex compound 15.2 parts of the above dye and 8 parts of chromic potassium sulfate are heated in 100 parts of formamide at 100° until the metallizing reaction is completed. The chromium complex compound is precipitated by diluting the mass with 300 parts of water. It is filtered off and the filter cake stirred into dilute aqueous sodium hydroxide solution to dissolve. Sodium chloride is added to precipitate the dye again and it is then filtered and dried. (The corresponding cobalt complex dye can be produced by the same procedure using a cobalt-yielding agent.) On grinding the chromium complex dye is obtained as a dark brown powder which dyes wool, silk, leather and polyamide and polyacrylonitrile fibers from a weakly acid bath in yellow-brown shades fast to light, washing, perspiration, water, rubbing, stoving, alkali and chlorine.

EXAMPLE 10

21.8 parts of diazotized 1-amino-2-hydroxybenzene-4-sulfonic acid methoxyamide and 27.6 parts of 7-hydroxynaphthalene-2-carbamic acid ethylglycol ester are reacted at 0–3° and a pH value of about 10 in the manner described in Example 1. The resulting dye is reacted with chromic potassium sulfate in formamide at 110–115° to yield the chrominum complex compound; the amount of the chromium salt solution used is such that 0.55 atom of chromium are present to 1 molecule of the dye.

The chromium complex dye thus formed is dyed on wool and polyamide fibers, e.g. nylon, from a neutral to weakly acid bath and gives greyish blue-red dyeings with good fastness properties, especially to milling, washing, perspiration, water, rubbing, stoving, alkali, chlorine and light.

Dyes with similarly good properties are obtained when the 27.6 parts of 7-hydroxynaphthalene-2-carbamic acid ethylglycol ester are replaced by the equivalent amount of 2 - hydroxy - 6 - carbethoxyaminonaphthalene or 2-hydroxy-5-acetylaminonaphthalene or 1-dimethylaminosulfonylamino-7-hydroxynaphthalene.

All the dyes mentioned above are suitable for dyeing and printing polyacrylonitrile fibers.

The following diazotized amines can be employed according to the procedures of Examples 1 to 8 with equally good success.

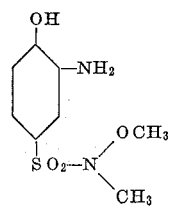

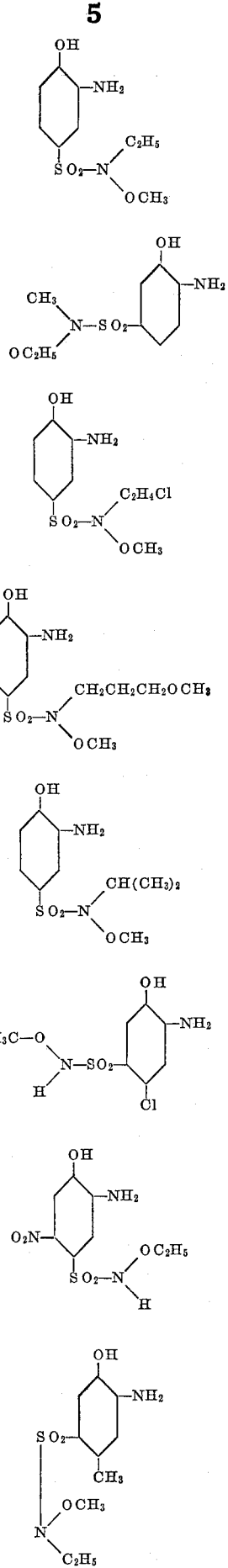

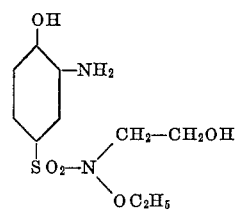

In general, particularly good dyes are obtained when the radical R of the substituent:

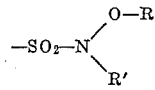

is an alkyl radical which may be substituted by non-water-solubilizing atoms or atom groups and R' is another such radical or hydrogen.

EXAMPLE 11

21.8 parts of 1-amino-2-hydroxybenzene-5-sulfonic acid methoxy amide are diazotized with ice cooling in a solution of 15 parts of 30% hydrochloric acid and 100 parts of water with 6.9 parts of sodium nitrite. The solution of the diazo compound is run into a solution of 14.3 parts of 2-aminonaphthalene in 200 parts of acetic acid and the mass stirred at 40° until coupling is completed. The red-brown dye formed is filtered off and dried.

The dye is converted into the cobalt complex compound by heating 18.6 parts of it with 7.1 parts of cobaltous sulfate in 100 parts of formamide at 80° until metallization is complete. The cobalt complex compound is precipitated by diluting with 200 parts of saturated common salt solution, isolated, dissolved in water with the aid of sodium hydroxide solution, salted out with common salt, isolated, dried and ground. It is a dark powder which dissolves in water with a blue-gray coloration and dyes wool, silk, leather, polyamide and polyacrylonitrile fibers from a weakly acid bath in blue-grey shades to light, washing, perspiration, milling, water, chlorine, stoving, rubbing, and alkali.

EXAMPLE 12

21.8 parts of 1-amino-2-hydroxybenzene-4-sulfonic acid methoxyamide are diazotized with 6.9 parts of sodium nitrite in the normal way and coupled with 21.4 parts of 5.8-dichloro-1-hydroxynaphthalene in dilute sodium hydroxide solution at 5–7°. The dye thus formed is a red-brown powder which dissolves in concentrated sulfuric acid with a green and in dilute sodium hydroxide solution with a red coloration.

For conversion into the chromium complex compound, 6.7 parts of the above dye, 1.6 parts of chromic formate, 1 part of sodium acetate and 60 parts of formamide are heated at 110° until no further metal-free dye is indicated. The chromium complex compound is precipitated by diluting the mass with 10% aqueous sodium chloride solution and it is then filtered off and dried. It is a dark powder that dissolves in dilute sodium hydroxide solution to give blue and in concentrated sulphuric acid to give olive solutions. Wool and polyamide fibers are dyed with this dye from a neutral to weakly acid bath in blue shades fast to light, milling, washing, perspiration, alkali, rubbing, water, stoving, and chlorine.

Table 2 contains further starting materials for the production of homogeneous azo dyes and metal-containing azo dyes according to the particulars of Examples 10 to 12. In column I the diazo component is given, in column (II) the coupling component, in column (III) the metal used for metal complex formation, and in column (IV) the shade of the wool dyeing.

Table 2

| Example No. | Diazo component (I) | Coupling component (II) | Metal (III) | Shade of dyeing on Wool (IV) |
|---|---|---|---|---|
| 13 | 1-amino-2-hydroxybenzene-5-sulfonic acid methoxyamide. | 2-phenylaminonaphthalene. | Co | Blue-grey. |
| 14 | ____do____ | 2-methylaminonaphthalene. | Co | Do. |
| 15 | 1-amino-4-nitro-2-hydroxybenzene. | 2-aminonaphthalene-6-sulfonic acid methoxyamide. | Co | Green-blue. |
| 16 | 1-amino-5-chloro-2-hydroxybenzene. | ____do____ | Co | Violet-blue. |
| 17 | 1-amino-5-chloro-4-nitro-2-hydroxybenzene. | 1-aminonaphthalene-4-sulfonic acid methoxyamide. | Co | Blue. |
| 18 | 1-amino-2-hydroxybenzene-5-sulfonic acid methoxyamide. | 1,3-diaminobenzene. | Co | Brown. |
| 19 | ____do____ | 2-aminonaphthalene-6-sulfonic acid methoxyamide. | Co | Green-blue. |
| 20 | ____do____ | 2-phenylaminonaphthalene-6-sulfonic acid methoxyamide. | Co | Do. |
| 21 | ____do____ | 2-methylaminonaphthalene-6-sulfonic acid ethoxyamide. | Co | Blue. |
| 22 | ____do____ | 1-phenyl-3-methyl-5-aminopyrazole. | Cr | Brown-red. |
| 23 | 1-amino-2-hydroxynaphthalene-4-sulfonic acid ethoxyamide. | }2-hydroxynaphthalene. | {Co / Cr | Violet-blue. / Blue. |
| 24 | 1-amino-2,5-methoxybenzene-4-sulfonic acid methoxyamide. | 2-hydroxynaphthalene-6-sulfonic acid ethoxyamide. | Cr | Do. |
| 25 | 1-amino-2-methoxybenzene. | 1-hydroxynapthalene-5-sulfonic acid butoxyamide. | Cr | Navy-blue. |
| 26 | 1-amino-2-hydroxy-3-nitro-5-tert.butylbenzene. | 1-hydroxy-naphthalene-3,6-disulfonic acid methoxyamide. | Cr | Blue. |
| 27 | 1-amino-2-carboxybenzene-4-sulfonic acid methoxyamide. | 1-acetoacetylamino-2-methoxybenzene. | Cr | Greenish-yellow. |
| 28 | 1-amino-2-hydroxybenzene-5-sulfonic acid amide. | 1-acetoacetylaminonaphthalene-4-sulfonic acid ethoxyamide. | Co | Yellow. |
| 29 | 1-amino-2-hydroxybenzene-5-sulfonic acid ethoxyamide. | }1-hydroxy-4-methyl-2-acetylaminobenzene. | {Cr / Co | Brown. / Do. |
| 30 | 1-amino-2-hydroxynaphthalene-4-sulfonic acid methoxyamide. | }2-hydroxy-naphthalene-6-methylsulfone. | {Cr / Co | Blue. / Violet. |
| 31 | 1-amino-2-carboxybenzene-4-sulfonic acid methoxyamide. | 2-acetoacetylaminonaphthalene-6-sulfonic acid dimethylamide. | Cr | Yellow. |

Table 3 below contains further starting dyes for the production of homogeneous, metal-containing disazo dyes according to the particulars of Example 9. In column (I) the diazo component is named, in column (II) the coupling component, in column (III) the metal used for metal complex formation and in column (IV) the shade of the dyeing on wool.

ing the mass with 300 parts of water. It is filtered off and the filter cake is dissolved in dilute aqueous sodium hydroxide solution. The dye is precipitated by the addition of sodium chloride, filtered, dried and ground to a black powder. This dyes wool, silk, leather and polyamide fibers from a weakly acid bath in blacks of good fastness to light, washing, perspiration, milling, chlorine, stoving, water, alkali, rubbing and carbonizing.

Table 3

| Example No. | Diazo component | Coupling component | Metal | Shade of dyeing on wool |
|---|---|---|---|---|
| 32 | 3-amino-4-hydroxy-1,1'-azobenzene-3'-sulfonic acid-methoxyamide. | }2-hydroxynaphthalene. | {Cr / Co | Grey-brown. / Red-brown. |
| 33 | ____do____ | 1-dimethylamino-sulfonylamino-7-hydroxy naphthalene. | Cr | Olive. |
| 34 | ____do____ | Acetoacetylamino-benzene. | Co | Yellow. |
| 35 | ____do____ | 2-aminonaphthalene. | Co | Bottle green. |
| 36 | 2-methyl-3-amino-4-hydroxy-1, 1'-azobenzene-4'-sulfonic acid-methoxyamide. | 2-hydroxynaphthalene. | Cr | Blue. |
| 37 | 2-hydroxy-3-amino-5-methyl-1,1'-azobenzene-3'-sulfonic acid-methoxyamide. | }____do____ | {Cr / Co | Blue. / Do. |

EXAMPLE 38

10.8 parts of the monoazo dye obtained by coupling diazotized 1-amino-2-hydroxy-5-nitrobenzene with 1-dimethylaminosulfonyl-amino-7-hydroxynaphthalene and 9.3 parts of the monoazo dye obtained by coupling diazotized 1-amino-2-hydroxybenzene-5-sulfonic acid methoxyamide with 2-hydroxynaphthalene are heated with 13 parts of chromic potassium sulfate in 150 parts of formamide at 100° until metallization is complete. The chromium complex compound is precipitated by dilut- In the following Table 4, the structural constitution of some heterogeneous metal complex dyes is given. In column (I) is listed the amount of the first monazo dye used, in column (II) the structural constitution of the azo compounds is given, in column (III) the amount of the second azo dye used, in column (IV) the structural constitution of some azo dyes suitable for the formation of metal complex compounds, in column (V) the metal used for metal complex formation, and in column (VI) the shade of the dyeings on wool.

Table 4

| Example No. | Parts (I) | 1st monoazo dye (II) | Parts (III) | 2nd monoazo dye (IV) | Metal (V) | Shade of dyeing on wool (VI) |
|---|---|---|---|---|---|---|
| 39 | 10.4 | 1-amino 2-hydroxy-4-nitrobenzene→2-amino-naphthalene-6-sulfonic acid methoxyamide. | 10.3 | 1-amino-2-hydroxybenzene-5-sulfonic acid amide→acetoacetylaminooctane. | Co | Green. |
| 40 | 11.2 | 3-amino-4-hydroxy-1,1'-azobenzene-3'-sulfonic acid-amide→2-hydroxynaphthalene. | 11.0 | 1-amino-2-hydroxybenzene-5-sulfonic acid methoxyamide→1-acetoacetylamino-2-ethylhexane. | Co | Khaki. |
| 41 | 10.4 | 1-amino-2-hydroxy-4-nitrobenzene→2-amino-naphthalene-6-sulfonic acid methoxyamide. | 10.2 | 1-amino-2-hydroxy-5-chlorobenzene→2-amino-naphthalene-6-sulfonic acid methoxyamide. | Co | Blue. |
| 42 | 13.5 | 1-amino-2-hydroxy-5-chloro-4-nitrobenzene→2-aminonaphthalene-6-sulfonic acid methoxyamide. | 11.6 | 1-amino-2-hydroxybenzene-5-sulfonic acid ethoxyamide→2-hydroxynaphthalene. | Co / Cr | Dark violet. / Violet. |

EXAMPLE 43

9 parts of the chromium complex dye obtained by metallization of diazotized 1-amino-2-hydroxy-5-nitrobenzene and 2-hydroxynaphthalene which contains one atom of metal to one atom of dye, 13.9 parts of the metal-free dye obtained from diazotized 1-amino-5-nitro-2-hydroxybenzene-3-carboxylic acid and 2-(2'-methoxyphenylamino)-naphthalene-6-sulfonic acid methoxy amide, and 5 parts of 10% sodium hydroxide solution are added to 135 parts of formamide. The mass is heated at 98–104° until the metal-free dye has disappeared. The resulting chromium complex compound is precipitated by dilution with 350–400 parts of a 3.5% aqueous sodium chloride solution. It is filtered off, washed, dried and ground. A grey powder is obtained which dyes wool and polyamide fibers from a weakly acid bath in reddish grey shades fast to light, washing, perspiration, stoving, chlorine, rubbing, water, sea water and alkali.

DYEING EXAMPLE A

A dyebath is prepared with 1000 parts of water and 0.15 part of the dye obtained according to Example 12. 10 parts of wetted-out wool are entered at 40° and the dyebath heated to 100° in the course of 20 minutes. It is held at this temperature for 1 hour. During the dyeing process 2 parts of 10% acetic acid are dropped into the boiling bath, and from time to time the water lost by evaporation is replaced. After dyeing, the blue-dyed wool is removed, rinsed and dried.

Polyamide fibers such as nylon are dyed in exactly the same way as wool. Silk also is dyed similarly to wool except that the temperature of the bath must not exceed 90° through out the process. Leather and paper are dyed by the normal methods used in practice.

DYEING EXAMPLE B 10 parts of wetted-out wool or 10 parts of wetted-out nylon are dyed with 0.9 part of the cobalt complex compound described in Example 32 by the procedure of Dyeing Example A, to give dark violet dyeings of good depth.

DYEING EXAMPLE C

A dyebath is prepared with 4000 parts of water and 2 parts of the dye obtained according to Example 10. 100 parts of a fabric of polyacrylonitrile fiber, e.g. "Courtelle" (registered trademark) are introduced into the bath. 20 parts of 10% sulfuric acid are added and the bath brought to the boil in 30 minutes and boiled for 30 minutes. Then 20 parts of 10% sulphuric acid are added dropwise to the boiling bath. Boiling is continued for 30 minutes and the water lost by evaporation replaced from time to time. After dyeing, the "Courtelle" fabric is removed, rinsed and dried. It is dyed in a grey-blue shade.

Formulae of representative dyes of the forgeing examples are as follows:

EXAMPLE 4

The 1:2 chromium complex compound of the azo dye of the formula

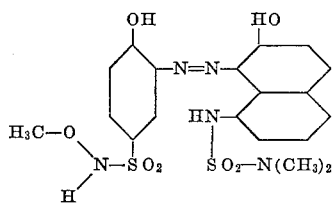

EXAMPLE 10

The 1:2 chromium complex compound of the azo dye of the formula

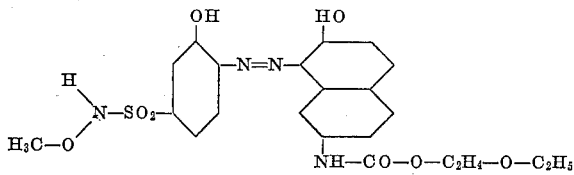

EXAMPLE 12

The 1:2 chromium complex compound of the azo dye of the formula

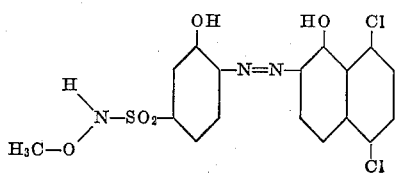

EXAMPLE 23

The 1:2 chromium and the 1:2 cobalt complex compound of the azo dye of the formula

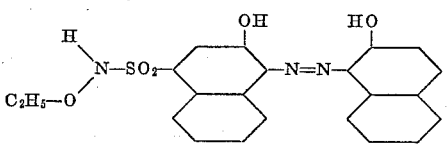

EXAMPLE 28

The 1:2 cobalt complex compound of the azo dye of the formula

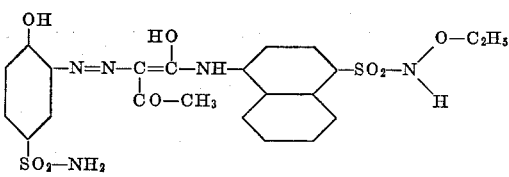

EXAMPLE 32

The 1:2 chromium and the 1:2 cobalt complex compound of the azo dye of the formula

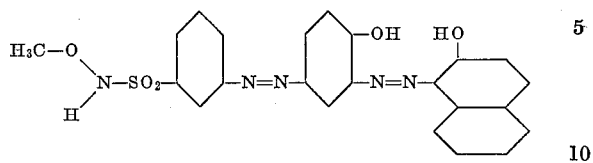

EXAMPLE 38

The heterogeneous 1:2 chromium complex compound of the azo dyes of the formula

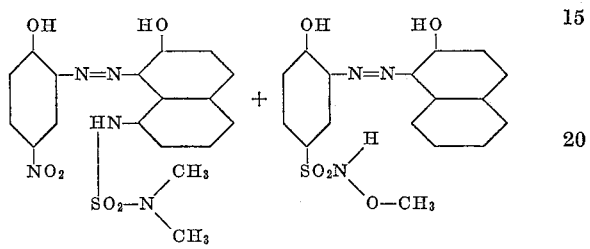

Having thus disclosed the invention what is claimed is:
1. A member selected from the group consisting of 1:2 chromium and 1:2 cobalt complex compounds of dyes of the formula

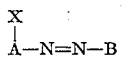

wherein
A is a member selected from the group consisting of
(i) a radical of a diazotized substituted aminobenzene wherein the substituents are selected from the group consisting of
4-sulfonic acid lower alkoxy amide,
5-sulfonic acid lower alkoxy amide,
4-sulfonic acid-N- lower alkoxy-N-lower alkyl amide,
5-sulfonic acid-N-lower alkoxy-N-lower alkyl amide,
4-sulfonic acid-N-lower alkoxy-N-chloro ethylamide,
4-sulfonic acid-N-lower alkoxy-N-lower alkyl lower alkoxy amide,
4-sulfonic acid-N-lower alkoxy-N-hydroxy lower alkyl amide,
chloro,
nitro,
lower alkyl,
lower alkoxy,
1,1'-azobenzene,
1,1'-azobenzene-3'-sulfonic acid-N-lower alkoxy amide,
1,1'-azobenzene-4'-sulfonic acid-N-lower alkoxy amide, and
1,1'-azobenzene-3'-sulfonic acid amide, and
(ii) a radical of a diazotized substituted aminonaphthalene, wherein the substituent is 4-sulfonic acid lower alkoxy amide;
X is a member selected from the group consisting of hydroxy, carboxy and lower alkoxy;
B is a radical of a coupling component selected from the group consisting of
(a) 1,3-diaminobenzene,
(b) as radicals coupling in the adjacent position to amino:
1-aminonaphthalene-4-sulfonic acid lower alkoxy amide,
2-aminonaphthalene,
2-phenylaminonaphthalene,
2-lower alkylaminonaphthalene,
2-aminonaphthalene-6-sulfonic acid lower alkoxy amide,
2-phenylaminonaphthalene-6-sulfonic acid lower alkoxy amide,
2-lower alkylaminonaphthalene-6-sulfonic acid lower alkoxy amide,
2-(2'-lower alkoxyphenylamino)-naphthalene-6-sulfonic acid lower alkoxy amide,
(c) 1-phenyl-3-methyl-5-amino-pyrazole,
(d) as radicals coupling in the adjacent position to hydroxy:
di-lower alkylamino-sulfonylamino-7-hydroxynaphthalene,
1-hydroxychloronaphthalene,
1-hydroxydichloronaphthalene,
1-hydroxy-lower alkoxy naphthalene,
7-hydroxynaphthalene-carbamic-acid ethylglycol ester,
2-hydroxy-di-lower alkylamino-naphthalene,
2-hydroxynaphthalene,
2-hydroxynaphthalene-6-sulfonic acid lower alkoxy amide,
1-hydroxynaphthalene-5-sulfonic acid lower alkoxy amide,
1-hydroxynaphthalene-3,6-disulfonic acid lower alkoxy amide,
2-hydroxynaphthalene-lower alkyl sulfone,
2-hydroxy-6-carbethoxy-aminonaphthalene,
2-hydroxy-5-acetylaminonaphthalene,
(e) 1-acetoacetylaminobenzene-3-sulfonic acid lower alkoxy amide,
(f) 1-acetoacetylamino-2-lower alkoxy benzene,
(g) 1-hydroxymethyl-acetylaminobenzene,
(h) acetoacetylaminobenzene,
(i) acetoacetylamino-octane, and
(j) 1-acetoacetylamino-2-ethyl-hexane,
at least one of the radicals A and B being substituted by at least one group of the formula

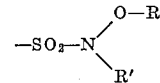

wherein
R is lower alkyl, and
R' is a member selected from the group consisting of hydrogen, lower alkyl, ethylene chloride, hydroxyethyl and propylene-methoxy.

2. The 1:2 chromium complex compound of the azo dye of the formula

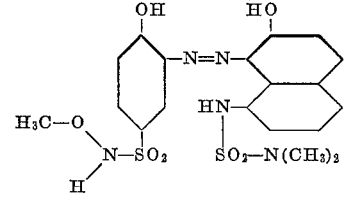

3. The 1:2 chromium complex compound of the azo dye of the formula

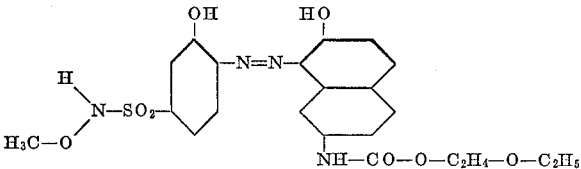

4. The 1:2 chromium complex compound of the azo dye of the formula

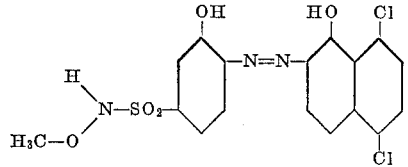

5. The 1:2 chromium complex of the azo dye of the formula

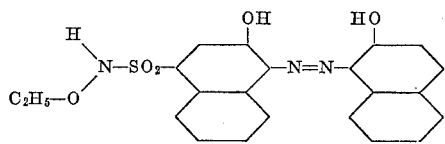

6. The 1:2 cobalt complex compound of the azo dye of the formula

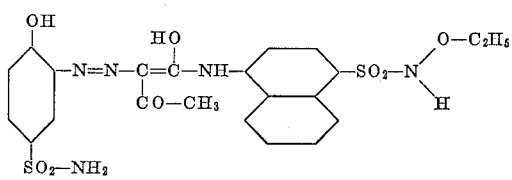

7. A member selected from the group consisting of the 1:2 chromium and 1:2 cobalt complex compound of the azo dye of the formula

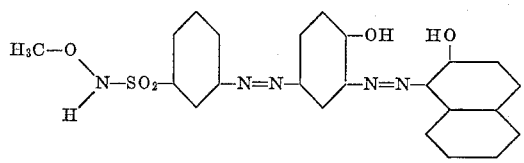

8. The 1:2 heterogeneous chromium mixed complex compounds obtained from the mixture of the azo dyes of the formula

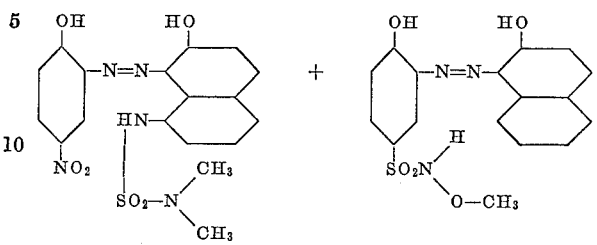

9. The 1:2 cobalt of the azo dye of the formula

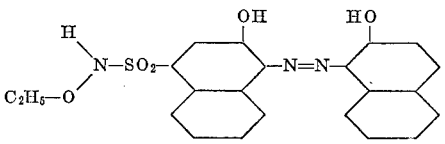

No references cited.

CHARLES B. PARKER, *Primary Examiner.*